United States Patent
Vergé et al.

(10) Patent No.: US 11,509,553 B2
(45) Date of Patent: Nov. 22, 2022

(54) METHODS AND DEVICES FOR PROVIDING REAL-TIME DATA VISUALIZATION OF IT-BASED BUSINESS SERVICES

(71) Applicant: Atos IT Solutions and Services, Inc., New Castle, DE (US)

(72) Inventors: Oscar Vergé, Brooklyn, NY (US); Javier Ponce Suarez, Brooklyn, NY (US)

(73) Assignee: ATOS FRANCE, Bezons (FR)

( * ) Notice: Subject to any disclaimer, the term of this patent is extended or adjusted under 35 U.S.C. 154(b) by 0 days.

(21) Appl. No.: 17/072,154

(22) Filed: Oct. 16, 2020

(65) Prior Publication Data

US 2022/0124011 A1    Apr. 21, 2022

(51) Int. Cl.
| | |
|---|---|
| *H04L 43/045* | (2022.01) |
| *H04L 9/40* | (2022.01) |
| *H04L 41/50* | (2022.01) |
| *H04L 41/28* | (2022.01) |
| *H04L 41/026* | (2022.01) |
| *G06Q 10/10* | (2012.01) |

(52) U.S. Cl.
CPC ......... *H04L 43/045* (2013.01); *G06Q 10/105* (2013.01); *H04L 41/026* (2013.01); *H04L 41/28* (2013.01); *H04L 41/5096* (2013.01); *H04L 63/0428* (2013.01); *H04L 63/105* (2013.01); *G06Q 2220/00* (2013.01)

(58) Field of Classification Search
CPC ........... G05B 2219/31472; G05B 2219/32128; G05B 2219/31467
See application file for complete search history.

(56) References Cited

U.S. PATENT DOCUMENTS

| | | | | |
|---|---|---|---|---|
| 10,452,734 | B1 * | 10/2019 | Merrill | G06F 3/04842 |
| 10,873,852 | B1 * | 12/2020 | Bernardi | H04L 69/163 |
| 2002/0178119 | A1 * | 11/2002 | Griffin | G06F 21/604 |
| | | | | 705/54 |
| 2008/0005115 | A1 * | 1/2008 | Corley | G06F 21/6209 |
| 2012/0011077 | A1 * | 1/2012 | Bhagat | G06Q 10/0635 |
| | | | | 705/317 |
| 2015/0105878 | A1 * | 4/2015 | Jones | G06F 9/44505 |
| | | | | 700/83 |
| 2017/0323089 | A1 * | 11/2017 | Duggal | H04W 4/00 |

\* cited by examiner

*Primary Examiner* — William G Trost, IV
*Assistant Examiner* — Christopher P Cadorna
(74) *Attorney, Agent, or Firm* — Arc IP Law, PC; Joseph J. Mayo

(57) ABSTRACT

The invention relates a method and a device for providing real-time data visualization indicative of statuses of one or more monitored services of an information technology, IT, system, the one or more monitored services being represented in a service management model that manages several service providers as a single data source, the IT system including a role-based access control system for allowing users access to the IT system, the method comprising:
  associating the single data source with the role-base access control system, such that one or more roles are assigned to each data element of the single data source,
  periodically requesting, from the single data source, one or more data elements indicative of statuses of said monitored services, and
  creating one or more data visualizations of the one or more data elements for a given user of the IT system, according to one or more rules.

19 Claims, 1 Drawing Sheet

METHODS AND DEVICES FOR PROVIDING REAL-TIME DATA VISUALIZATION OF IT-BASED BUSINESS SERVICES

TECHNICAL FIELD

This invention relates to the monitoring of information technology (IT) systems and, more particularly, to methods and devices for providing real-time data visualization of IT-based business services.

BACKGROUND ART

Nowadays, as information systems become ubiquitous, and companies and organizations of all sectors become severely dependent on their computing network and IT services, the demand for service management tools for monitoring IT systems increases rapidly.

Indeed, service management tools are IT solutions that their users use for managing the availability and performance of IT-based business services from the end user's perspective. These tools can detect and evaluate the health and availability of a service or application, recognize and warn the operator when a problem is about to occur and respond automatically to poor performance. Said users particularly require these tools for keeping an overview over the performance of heterogeneous or historically grown IT systems.

One feature of those service management tools is to provide, in real time, through data visualization, the status of the services that are monitored.

Data visualization applications enable a user to understand a data set visually, including distribution, trends, outliers, and other factors that are important to making business decisions.

However, one could create some data visualizations based on sensitive data, where such data visualization should not be shown to all users of the IT system.

Hence, there is a need in the art for a computer system for providing real-time data visualization to all users of the IT system in a secured way.

SUMMARY OF INVENTION

Embodiments of the invention provide a method and a device for providing real-time data visualization indicative of statuses of one or more monitored services of an information technology system.

These and other aspects of the invention will be apparent from and elucidated with reference to the embodiments described hereinafter.

BRIEF DESCRIPTION OF DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DESCRIPTION OF EMBODIMENTS

Figure 1:
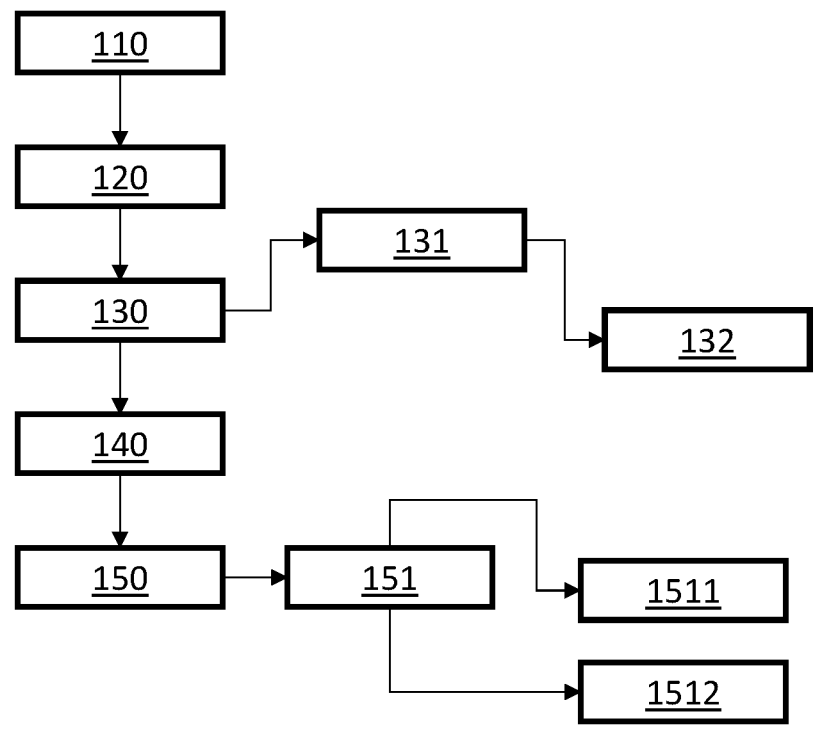
FIG. 1 is a flow chart showing a method according to an embodiment of the invention.
Figure 2:
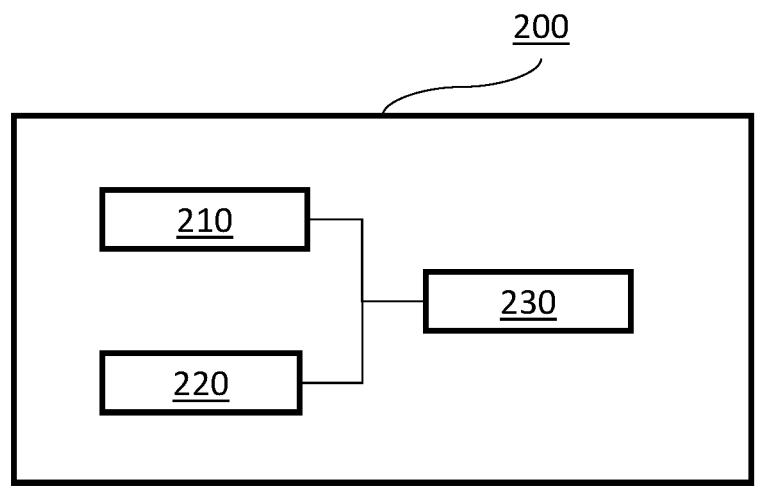
FIG. 2 is a block diagram showing a device according to an embodiment of the invention.

The present invention allows the creation of data visualization for specific groups of users of an IT system based on their associated role.

The invention relates to a computer-implemented method 100 for providing real-time data visualization.

In the context of the invention, a data visualization is a graphical display of data, the data corresponding to a quantitative information or a qualitative information.

In an example, types of data visualizations include charts, tables and maps.

A chart includes a collection of visual elements used to convey information. In that case, data is converted to a pictorial representation such as a line, representative area, color and the like.

A table displays a set of data into a series of columns and rows. The table can have row and column headings, where each cell in a table can show the value associated with the specific combination of row and column headings. Some tables can hold charts or maps in their cells; this is a spatially economical way to display many charts with common axes. To facilitate representation in two dimensions, higher-dimensional tables of data are often represented using a plurality of two-dimensional tables.

A map is a simplified depiction of a space that highlights relations between elements in the space. Typically, a map is a planar, geometrically accurate representation of a space. A map is not limited to a two-dimensional cartographic map. A map can be augmented to include extra information presented in the form of an added element, e.g., height, color, density. A map may include other visualizations in regions of the map, e.g., a map with pie charts in each region.

In the invention, a data visualization is indicative of statuses of one or more monitored services of an information technology (IT) system.

As a reminder, one should consider that an IT system is configured for offering services to consumers. Such consumers could be employees and/or customers of a given company.

An example of a service for employees could be a facility for exchanging electronic mails or for accessing electronic databases.

An example of a service for customers could be a company's webpage.

Hence, in the context of the invention, services range from low-level network components such as routers or switches to software applications such as Microsoft™ Office or an Oracle™ database, and from hardware-based services such as printing or displaying capabilities, up to abstract high-level services such as the marketing department that itself uses various other IT services.

In other words, these different kinds of services comprise one or more hardware or software components within the computing environment. Indeed, most services are, in fact, an aggregation of applications and computer systems. All these services and their individual components represent nodes within a network and can be represented as elements in a service management model. Therefore, in the invention, the term IT system should be understood as comprising IT networks, but also to applications, services, software components and network elements.

In particular, in the invention, the one or more monitored services are represented in a service management model that manages several service providers as a single data source. Hence, in the invention, one can manage several services through one source of data.

In the context of the invention, a data source is an information structure, which comprises one or more data elements, and the use of which is controlled by a data management system. Data sources include sources of data that enable data storage and retrieval. Data sources may include databases, such as relational, transactional, hierarchical, multidimensional (e.g., OLAP), object-oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open DataBase Connectivity (ODBC) and the like. Data sources may also include a data source where the data is not stored like data streams, broadcast data, and the like.

In an embodiment, the service management model is an ITIL-based Service Management Model such as the Atos Service Management Model (ASMM), where ITIL stands for IT Infrastructure Library.

Furthermore, the IT system includes a role-based access control system for allowing users access to the IT system.

In the context of the invention, a role-based access control system creates roles for various functions that are allowed within the IT system. The permissions to perform certain operations are assigned to specific roles. Users or other entities or "subjects" are assigned particular roles, and through those role assignments acquire the permissions to perform particular functions within the IT system. Since the subjects are not assigned permissions directly, but only acquire them through their role (or roles), management of individual rights becomes a matter of assigning appropriate roles to the subject rather than individual permissions for each and every subject.

In FIG. 1, at sept 110, the method 100 associates the single data source with the role-base access control system, such that one or more roles are assigned to each data element of the single data source.

In an example, said association could be performed manually by an administrator of the IT system.

In an example, the one or more roles are selected from a group consisting of a Business Domain role, a Region/location type role, and an Executive Operations/Leadership role.

At step 120, the method 100 periodically requests, from the single data source, one or more data elements indicative of statuses of said monitored services.

In an example, the method 100 periodically requests the one or more data elements every 10 seconds to 10 minutes. However, other periods could be contemplated without requiring substantial modification of the invention.

Finally, at step 130, the method 100 creates one or more data visualizations of the one or more data elements for a given user of the IT system, according to one or more rules.

In particular, one of the rules is an ignore rule that excludes a data element from contributing to the data visualization when none of the one or more roles assigned to said data element match the role assigned to the given user.

Furthermore, within step 130, at step 131, the methods 100 labels with an ignore status the data elements that are not intended to contribute to the creation of the data visualization.

Still further, within step 130, at step 132, the methods 100 excludes the data elements labeled with the ignore status from the creation of the data visualization, according to the ignore rule using the ignore status.

Based on the foregoing, data visualizations can be created specifically for one or more group of users of the IT system based on their associated role.

In an embodiment of the invention, the rules further include at least one of:
  a rule that is based on additional attributes of the service other than the status;
  a rule that is defined by the given user based on at least one of i) logical and ii) arithmetical operations of the status of interrelated services or of said attributes; and
  a rule that is programmed individually by a user.

In another embodiment of the invention, the rules further include a time information determined from a time, a time of the day, a time of the year, a date, a pause time and/or a frequency.

In yet another embodiment, at step 140, the method 100 further presents the one or more data visualizations in a graphical user interface (GUI) displayed on a device of the given user, wherein the presenting includes at least one virtualized software-as-a-service (SaaS) application.

In the context of the invention, a GUI is a type of user interface that allows users to interact with electronic devices with images rather than text commands. A GUI represents the information and actions available to a user through graphical icons and visual indicators, as opposed to text-based command interfaces. Actions are usually performed by a user through direct manipulation of the graphical elements.

In the context of the invention, a SaaS application runs on virtual machine of a given cloud infrastructure. This way, the SaaS application is accessible from various client devices through a thin client interface.

In an example, the virtualized SaaS application is a web application.

In another embodiment, at step 150, the method 100 further notifies the given user of the creation of the one or more data visualizations.

In a particular embodiment of step 150, at step 151, the notifying includes sending a message to the device of the given, the message being selected from the group consisting of a MMS, a SMS, a social media message (e.g., a message such as those circulating on Facebook, Twitter, Instagram, WhatsApp, Skype, Viber, and Joyn).

In a first example, at step 1511, the sending includes using 1511 an encrypted connection within a communication network.

For example, the encrypted connection is an HTTPS connection.

In a second example, at step 1512, the sending includes encrypting 1512 the message.

For example, the message is encrypted using an encryption algorithm selected from the group consisting of RSA (Rivest-Shamir-Adleman), DSA (Digital Signature Algorithm), ECDSA (Elliptic Curve Digital Signature Algorithm), 3DES (Triple Data Encryption Algorithm) and AES (Advanced Encryption Standard).

The invention also relates to a computer system 200 for providing real-time data visualization indicative of statuses of the one or more monitored services of the IT system.

In particular, the computer system comprises a user interface 210, a user graphical display 220 and at least one processor 230.

The user interface 210 is configured for configuring rules.

In a first example, the user interface 210 is a graphical user interface.

In a second example, the user interface 210 is an application programming interface to other programming languages.

In a third example, the user interface 210 is a script programming language of which the syntax is provided by the processor.

The user graphical display 220 is configured for visualizing data visualizations.

The processor 230 is configured for:
associating the single data source with the role-base access control system, such that one or more roles are assigned to each data element of the single data source,
periodically requesting, from the single data source, one or more data elements indicative of statuses of said monitored services, and
creating one or more data visualizations of the one or more data elements for a given user of the IT system, according to one or more rules, wherein one of the rules is an ignore rule that excludes a data element from contributing to the data visualization when none of the one or more roles assigned to said data element match the role assigned to the given user, and wherein creating the one or more data visualizations comprise,
labeling with an ignore status the data elements that are not intended to contribute to the creation of the data visualization, and
excluding the data elements labeled with the ignore status from the creation of the data visualization, according to the ignore rule using the ignore status.

In an embodiment, the processor 230 is further configured to cause the user graphical display to display the one or more data visualizations in at least one virtualized software-as-a-service, SaaS, application.

In an example, the virtualized SaaS application is a web application.

In an embodiment of the invention, the rules further include at least one of:
a rule that is based on additional attributes of the service other than the status;
a rule that is defined by the given user based on at least one of i) logical and ii) arithmetical operations of the status of interrelated services or of said attributes; and
a rule that is programmed individually by a user.

In another embodiment of the invention, the rules further include a time information determined from a time, a time of the day, a time of the year, a date, a pause time and/or a frequency.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices or logic blocks to achieve the same functionality is effectively "associated" such that the desired functionality is achieved. Hence, any two devices or logic blocks herein combined to achieve a particular functionality may be seen as "associated with" each other such that the desired functionality is achieved, irrespective of architectures or intermediate devices. Likewise, any two devices or logic blocks so associated can also be viewed as being "operably connected," or "operably coupled," to each other to achieve the desired functionality.

Furthermore, those skilled in the art will recognize that boundaries between the above-described operations are merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

However, other modifications, variations and alternatives are also possible. The specifications and drawings are, accordingly, to be regarded in an illustrative rather than in a restrictive sense.

While select embodiments have been described herein, it will be apparent to those skilled in the art that the disclosed methods, architecture, and apparatuses may incorporate changes and modifications without departing from the general scope of this invention. The invention is intended to include all such modifications and alterations as far as they come within the scope of the appended claims or equivalents thereof.

What is claimed is:

1. A computer-implemented method for providing real-time data visualization indicative of statuses of one or more monitored services of an information technology (IT) system, the one or more monitored services being represented in a service management model that manages several service providers as a single data source, the IT system including a role-based access control system for allowing users access to the IT system, the computer-implemented method comprising:
associating the single data source with the role-based access control system, wherein the single data source is an information structure that comprises one or more data elements, such that one or more roles are assigned to each data element of the one or more data elements of the single data source,
periodically requesting, from the single data source, one or more of said one or more data elements that are indicative of statuses of said one or more monitored services,
wherein the one or more monitored services are represented in the service management model that manages the several service providers as the single data source,
such that several services of the several service providers are managed via the single data source, and
creating one or more data visualizations of the one or more data elements for a given user of the IT system, according to one or more rules,
wherein one of the one or more rules is an ignore rule that excludes a data element of said one or more data elements from contributing to the one or more data visualizations when none of the one or more roles assigned to said each data element matches a role assigned to the given user, and
wherein said creating the one or more data visualizations comprises
labeling with an ignore status at least one data element of the one or more data elements that are not intended to contribute to creation of the one or more data visualizations via the creating of the one or more data visualizations, and excluding the at least one data element of the one or more data elements labeled with the ignore status from the creation of the one or more data visualizations, according to the ignore rule using the ignore status.

2. The computer-implemented method of claim 1, further comprising presenting the one or more data visualizations in a graphical user interface (GUI) displayed on a device of the given user, wherein the presenting comprises at least one virtualized software-as-a-service (SaaS) application.

3. The computer-implemented method of claim 2, wherein the at least one virtualized SaaS application is a web application.

4. The computer-implemented method of claim 1, further comprising notifying the given user of the creating of the one or more data visualizations.

5. The computer-implemented method of claim 4, wherein the notifying comprises sending a message to a device of the given user, the message being selected from a group consisting of a Multimedia Messaging Service (MMS), a Short Message Service (SMS), and a social media message.

6. The computer-implemented method of claim 5, wherein said message is sent via an encrypted connection within a communication network.

7. The computer-implemented method of claim 5, wherein the sending includes encrypting the message.

8. The computer-implemented method of claim 1, wherein the one or more rules further comprise at least one of
a rule that is based on additional attributes of the one or more monitored services other than a status;
a rule that is defined by the given user based on at least one of
logical and
arithmetical operations of a status of interrelated ones of the one or more monitored services or of said additional attributes; and
a rule that is programmed individually by the given user.

9. The computer-implemented method of claim 1, wherein the one or more rules further comprise a time information determined from one or more of a time, a time of day, a time of year, a date, a pause time, a frequency.

10. The computer-implemented method of claim 1, wherein the service management model is an IT Infrastructure Library (ITIL) based Service Management Model.

11. A computer system for providing real-time data visualization indicative of statuses of one or more monitored services of an information technology (IT) system, the one or more monitored services being represented in a service management model that manages several service providers as a single data source, the IT system including a role-based access control system for allowing users access to the IT system, the computer system comprising:
a user interface configured to configure rules;
a user graphical display configured to visualize data visualizations; and
at least one processor configured to
associate the single data source with the role-based access control system, wherein the single data source is an information structure that comprises one or more data elements, such that one or more roles are assigned to each data element of the one or more data elements of the single data source,
periodically request, from the single data source, one or more of said one or more data elements that are indicative of statuses of said one or more monitored services,
wherein the one or more monitored services are represented in the service management model that manages the several service providers as the single data source,
such that several services of the several service providers are managed via the single data source, and
create one or more data visualizations of the one or more data elements for a given user of the IT system, according to one or more rules,
wherein one of the one or more rules is an ignore rule that excludes a data element of said one or more data elements from contributing to the one or more data visualizations when none of the one or more roles assigned to said each data element matches a role assigned to the given user, and
wherein said create the one or more data visualizations comprises
labeling with an ignore status at least one data element of the one or more data elements that are not intended to contribute to creation of the one or more data visualizations via the create of the one or more data visualizations, and
excluding the at least one data element of the one or more data elements labeled with the ignore status from the creation of the one or more data visualizations, according to the ignore rule using the ignore status.

12. The computer system of claim 11, where the at least one processor is further configured to cause the user graphical display to display the one or more data visualizations in at least one virtualized software-as-a-service (SaaS) application.

13. The computer system of claim 12, wherein the at least one virtualized SaaS application is a web application.

14. The computer system of claim 11, wherein the one or more rules further comprise at least one of
a rule that is based on additional attributes of the one or more monitored services other than a status;
a rule that is defined by the given user based on at least one of
logical and
arithmetical operations of a status of interrelated ones of the one or more monitored services or of said additional attributes; and
a rule that is programmed individually by the given user.

15. The computer system of claim 11, wherein the one or more rules further comprise a time information determined from a time, a time of day, a time of year, a date, a pause time and/or a frequency.

16. The computer system of claim 11, wherein the user interface is a graphical user interface.

17. The computer system of claim 11, wherein the user interface is an application programming interface to other programming languages.

18. The computer system of claim 11, wherein the user interface is comprises a script programming language of which syntax is provided by the at least one processor.

19. The computer system of claim 11, wherein the service management model is an IT Infrastructure Library (ITIL) based Service Management Model.

* * * * *